United States Patent [19]
Krejci, III

[11] 3,740,091
[45] June 19, 1973

[54] ENERGY ABSORBING SEAT ASSEMBLY
[76] Inventor: Joseph A. Krejci, III, 1967 N. 18th Avenue, Apt. 5, Melrose Park, Ill. 60160
[22] Filed: June 3, 1971
[21] Appl. No.: 149,567

[52] U.S. Cl. .................. 296/68, 296/146, 297/216
[51] Int. Cl. ............................................ B60n 1/04
[58] Field of Search ............... 296/68, 65 R, 65 A, 296/146; 297/216, 349, 240

[56] References Cited
UNITED STATES PATENTS

| | | | |
|---|---|---|---|
| 3,322,458 | 5/1967 | Bachmann | 296/65 R |
| 2,952,304 | 9/1960 | Pinkel | 297/216 |
| 2,874,993 | 2/1959 | Probst | 297/349 X |
| 3,165,355 | 1/1965 | Hitchcock | 297/216 |

FOREIGN PATENTS OR APPLICATIONS

| | | | |
|---|---|---|---|
| 306,860 | 2/1917 | Germany | 296/68 |

*Primary Examiner*—Leo Friaglia
*Assistant Examiner*—John A. Pekar
*Attorney*—Richard R. Mybeck

[57] ABSTRACT

An energy absorbing seat assembly for use in mobile vehicles to protect the occupant from injury in the event of a collision. The assembly comprises an energy absorbing seat mounted on a frame which is selectively pivotal relative to the vehicle.

7 Claims, 4 Drawing Figures

PATENTED JUN 19 1973
3,740,091
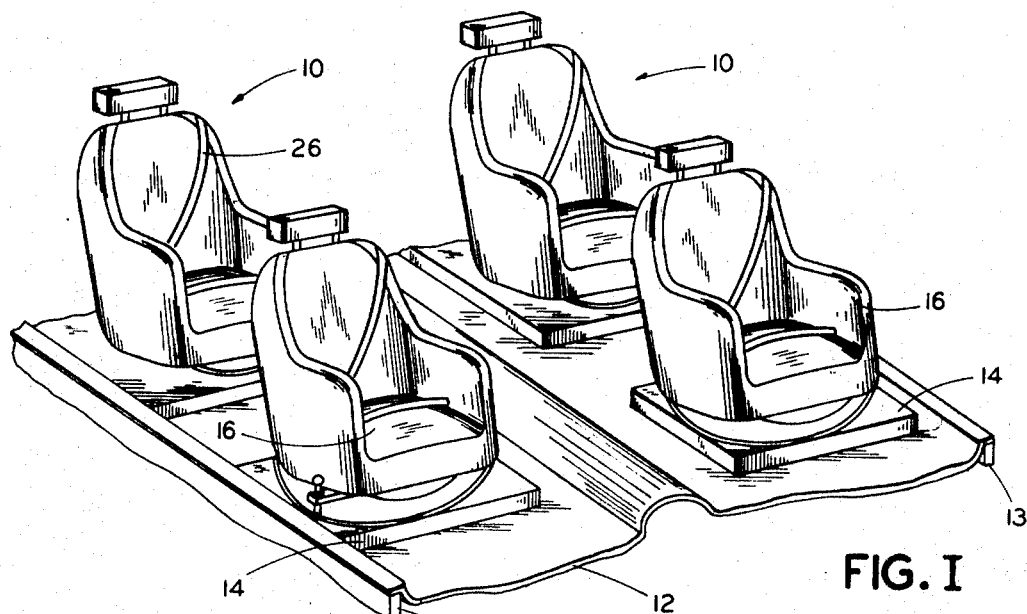
FIG. I
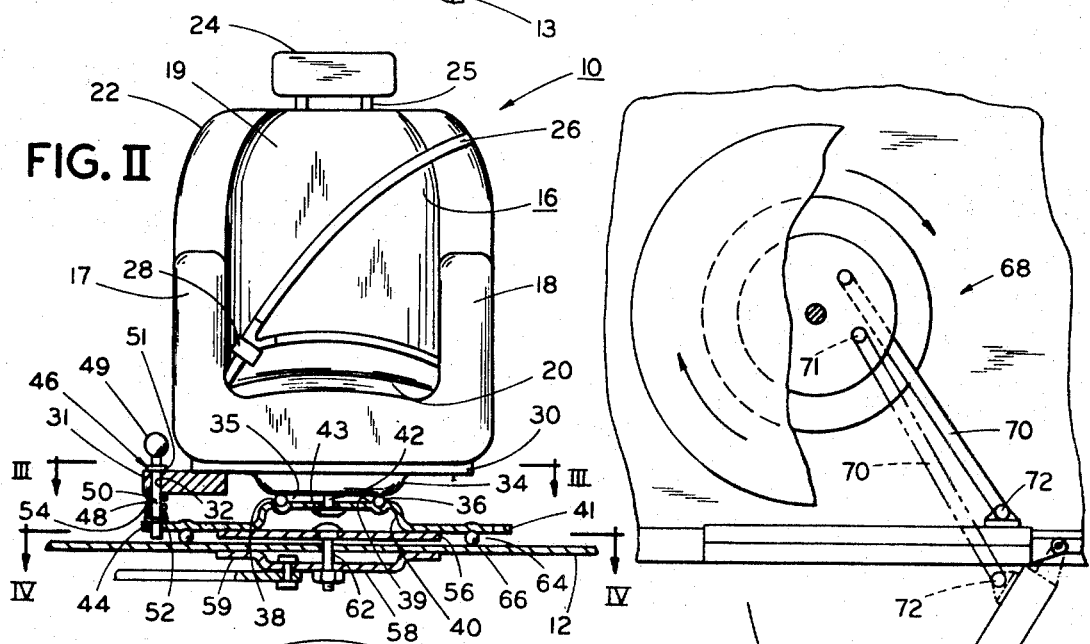
FIG. II
FIG. IV
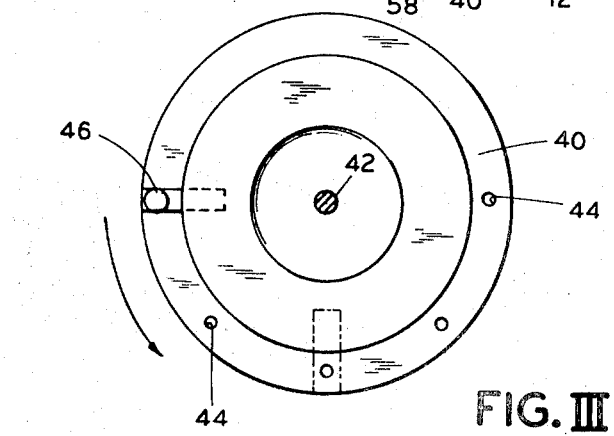
FIG. III
INVENTOR
JOSEPH A. KREJCI III
BY Richard R. Mybeck
ATTORNEY

ENERGY ABSORBING SEAT ASSEMBLY

DESCRIPTION OF INVENTION

This invention relates to energy absorbing seat assemblies for motor vehicles and more particularly to improvements in such seat assemblies to substantially protect the occupant thereof from serious injury in the event such vehicle is involved in a collision or is otherwise subjected to the application of abnormal forces.

The improvements of the present invention are especially adapted for the right front seat, i.e., the so-called "death seat" of motor vehicles, but can be used for rear seats and drivers seats with equally great benefit.

The rapid increase in serious injuries and death from motor vehicle accidents has become a national concern. During the year just past, death from automobile accidents exceeded fifty thousand while injuries exceeded three million. Automobile accidents exceeded twelve million.

The need for additional safeguards in motor driven land vehicles has received a lot of attention in the nation's news media and in the Congress. Indeed, the Transportation Department has given automobile manufacturers until 1973 to develop stronger car doors to protect the occupants thereof from death or serious injury from side collisions. The National Highway Safety Bureau has determined that side-impact accidents account for about 14 percent of all accidents but 21 percent of the fatality rate.

Another source of a disproportionate number of injuries is the so-called "rear end collision," a most frequent occurrence in the age of expressway travel.

From the foregoing it becomes apparent that a great need exists for improved safety devices in motor vehicles and it is especially significant that the assembly of the present invention is capable of protecting the occupant from both longitudinal and lateral forces applied to the vehicle.

Several efforts in the prior art have been directed toward the objective of this invention and have met with varied degrees of success. As the statistics enumerated above demonstrate, however, the problem still remains and additional solutions are needed. Even the recent proposal of an inflatable air bag fails in its total objective because it completely obscures vision.

The present invention is predicated upon my design of a novel energy absorbing seat assembly which receives and holds the occupant in a position secure from collision forces while including mechanisms which facilitate ingress to and egress from the seat and allows the seat to be oriented in a direction of maximum safety relative to operating conditions.

Accordingly, a prime objective of the present invention is to provide an energy absorbing seat assembly which overcomes the disadvantages of the prior art while enhancing the safety and substantially reducing the liklihood of injury to an occupant thereof in the event the vehicle in which the assembly is installed is involved in a collision.

Another object of the present invention is to provide a new and improved energy absorbing seat assembly which provides a protective cell acound the occupant and is selectively pivotal to enhance the ingress to and egress from as well as the relative positioning of the seat to maximize its protection.

A further object of the present invention is to provide an improved energy absorbing seat assembly which effectively protects the occupant thereof from injury when the vehicle in which the assembly is installed suddenly changes speed or direction.

Still another object of the present invention is to provide an improved energy absorbing seat assembly which encases the occupant thereof to provide both spinal and lateral support thereto.

A still further object of the present invention is to provide an improved energy absorbing seat assembly which when installed in the right front position within a vehicle cab, is pivotal to a rear-facing position and thus converts the "death seat" into a seat of maximum safety.

These and still further objects of the present invention as shall hereinafter appear are fulfilled by the present invention in a remarkably unexpected fashion as can be readily discerned from the following detailed description of an exemplary embodiment thereof, especially when read in conjunction with the accompanying drawing in which:

FIG. 1 is an isometric showing of a vehicle bed showing a plurality of seat assemblies mounted therein;

FIG. 2 is a frontal view, partially in section, of an energy absorbing seat assembly embodying the present invention;

FIG. 3 is a cross-sectional view taken along line III—III of FIG. 2; and

FIG. 4 is a cross-sectional view taken along line IV—IV of FIG. 2.

Referring to the drawings in which like parts bear like numerals throughout the several views, the seat assembly of the present invention is identified by general reference 10.

Referring to FIG. 1, a plurality of seat assemblies 10 are shown installed relative to the interior of a motor vehicle such as an automobile, bus, truck, limousine, airplane, dirigible, train, street car or the like.

The interior floor of the vehicle is represented by a floor board 12 supported upon a frame 13. Disposed upon and secured to floor board 12 is a platform 14 positioned for the operative support of a seat assembly 10 in a manner to be hereinafter described.

Each seat assembly 10 comprises a padded chair 16 having spaced arm portions 17, 18 interconnected by a back rest 19 and a seat portion 20. In a preferred embodiment of the invention, an outer shell 22 is of unitary structure and defines the exterior surfaces of both arm portions 17, 18, the back rest portion 19 and the seat portion 20. Shell 22 may be formed of fiberglass, aluminum or other materials formable into substantially rigid structures such as plastics and metals and the like.

As an optional feature of the assembly, a conventional headrest 24 may be secured to the back rest 19 by support members 25 which may be adjustable vertically to conform to the height of the occupant. Alternatively, back rest 19 is proportioned to extend at least above the shoulders of the occupant thereby providing support and protection for the occupant's head.

Each seat is also preferably provided with a cross-torso type seat belt 26 which extends from an anchor (not shown) on the rear surface of the back rest 19 for detachable locking insertion within a suitable buckle 28 for use in the normal fashion. Of course, a conventional lap belt (not shown) can be combined with the belt 26 or mounted independently depending upon the manufacturer's preference.

The arm members 17, 18, back rest 19, and seat 20 are formed by the attachment to the shell 22 of a generous thickness that is, from 3 to 6 inches, of padding such as kapok, foam rubber, plastic foam or like resilient material characterized by its ability to absorb shock and to substantially conform to the shape of the passenger engaged thereby. A secondary consideration is that such materials also provide great comfort to the passenger using them.

Each seat assembly 10 is pivotable in two different manners as will appear from the description of the mounting assembly.

Referring to FIG. 2, each seat 16 is suitably attached to a support plate 30 to which is mounted as by welding adjacent an edge thereof, an outreaching flange member 31 having a vertically extending hole 32 drilled therethrough, the purpose of which will be later described.

Complete circumferential rotation throughout any arc up to and including 360° is provided each seat 16 by an assembly comprising a plate cover 34 having an annular race 35 defined therein for receiving the operative surface of bearings 36 and a second raceway 38 defined in the upper surface 39 of cover plate 40. The rotation of seat 16 upon bearings 36 is provided by the rotation of plate cover 34 relative to cover plate 40 about a central axis defined by pin 42 which extends through plate cover 34 and cover plate 40 to function as an axle. Pin 42 is provided with suitable detents 43 at each end thereof to maintain the pin 42 in its described position.

A plurality of openings 44 are defined in an annular pattern adjacent the periphery of cover plate 40 in a preselected pattern to provide, in the manner to be now described, locating means which serve to arrest the rotation of seat 16 and retain the seat 16 in a preselected position.

Spring loaded locking means 46 comprising a pin 48 having a handle portion 49 at the uppermost end thereof and sufficient length to extend through both hole 32 and one of the openings 44. Pin 48 further comprises a shank portion 50 which extends through said openings 32, 44 when means 46 is in its "at rest" position. Shank portion 50 is provided with an upper flange 51 and a lower flange 52, welded or otherwise secured thereto, which serve to seat pin 48 relative to flange 31 and cover plate 40. Intermediate flange 31 and cover plate 40 in circumscription about pin 48 is a suitable compression spring 54 which holds pin 48 into a locking position, when no force is applied to handle 49, and which returns pin 48 into a locking position, when force applied upwardly at handle 49 is subsequently released.

The relative movement between plate cover 34 and cover plate 40 is obtained through the attachment of the seat assembly 10 to the vehicle floor board 12 in a manner to be now described.

Upon the floor board 12 at the desired location of the seat assembly 10, a reinforcing plate 56 is disposed. Beneath the floor board 12 at the same approximate location, a dished cover plate 58 is disposed so that the plate flange 59 engages the lower surface 60 of floor board 12 in slidable engagement therewith. Suitable securing means, such as nut and bolt assembly 62, are passed through plate 56, an opening 60 defined in floor board 12, and dished cover plate 58 to secure plates 56 and 58 into a stationary position relative to each other so that, as will later appear, plate 56 will move in response to movement imparted to cover plate 58 on bolt 62 in opening 60.

Because it is desired that cover plate 40 responds to movement of plate 56 while remaining stationary relative to movement of plate 34, a suitable annular raceway 64 is defined by and between flange 41 of cover plate 40 and floor board 12 to operatively receive and retain bearings 66 therewithin. The transmission of movement from plate 56 to cover plate 40 is effected by welding or otherwise securing the outer edge of plate 56 to the flange 41 of plate 40.

To provide for the movement of seat assembly 10 when it is mounted adjacent a door used for entering or leaving the vehicle to facilitate such ingress and egress, linkage means 68 are provided. Linkage means 68, as illustrated in FIGS. 3 and 4 are formed by an arm member 70 pivotally attached to cover plate 58 with suitable connectors such as rivet 71 and pivotally attached with a like connector 72 to the vehicle door 73. When the car door 73 is opened, arm member 70 is drawn outwardly and rotates cover plate 58 in the direction of the door. As the door is closed, arm member 70 is pushed inwardly and rotates cover plate 58 and hence the entire seat assembly back to its original position before the door was opened.

In operation, seat 16 can be arranged in any given position by pulling up on handle 49 to disengage pin 48 from within hole 44 whereupon the seat 16 can rotate around pin 42 on bearings 36. When the desired position is obtained, handle 49 is released and spring 54 returns pin 48 into the hole 44 on cover 40 corresponding thereto and seat 16 is then locked in position, facing either forward or rearward. To change position, the procedure is repeated.

To assist passengers to gain ingress to or egress from seat 16, linkage means 68 connect lower cover plate 58 to a car door 73 so that as the door 73 is opened, plate 58 and hence reinforcing plate 56 and cover plate 40 rotate toward the open door in response thereto for ease of entry. As the door is closed, the force sequence is reversed and the seat is returned to its original position.

When the passenger is seated in seat 16 mounted in a vehicle which is subsequently involved in a "head-on" or a "rear-end" collision, the seat design holds the passenger securely therewith and literally makes him a part thereof by the coaction of the arm portions 17, 18, back rest 19 and seat 20 with one or more seat belts 26, and the jolt of impact and the resulting injury caused by a free flying body or the intense snapping of a partially secured body (so-called "whip lash") is avoided because the shock is absorbed in the resilient compressible material with which the seat is filled.

In a similar manner, the passenger is protected from a side collision for he is totally engulfed within the arm portions 17,18 of the chair which absorb the shock.

From the foregoing it becomes apparent that I have herein described and illustrated a new and improved energy absorbing seat assembly which fulfills all of the aforestated objectives in a remarkably unexpected fashion. It is of course understood that such modification, adaptations and alterations as may readily occur to the artisan confronted with this disclosure are intended within the spirit hereof which is limited only by the scope of the claims appended hereto.

What I claim is:

1. An energy absorbing seat assembly for use in vehicles comprising: a padded chair for receiving and protecting a passenger seated therewithin and absorbing any energy transmitted thereto, said chair having unitary outer shell defining spaced arm portions, a back portion, and a seat portion, said back portion and said seat portion being operatively interposed between and interconnecting said arm portions to form an integral structure therewith; a vehicle frame; securing means for connecting said chair to said frame to permit selective rotation of said chair relative to said frame through 360°; and follower means operatively associated with said chair to permit said chair to respond to movement of a vehicle door to enhance egress from and ingress to said chair independently of said securing means.

2. An assembly according to claim 1 in which said unitary outer shell has disposed thereupon a relatively thick padding of a resilient shock-absorbing passenger-shape-conforming material to engage a passenger seated therewithin to provide both lateral and spinal support thereto.

3. An assembly according to claim 1 in which said follower means comprises an arm member pivotally attached to said door and said chair and operative to rotate said chair in response to movement of said door.

4. An energy absorbing seat assembly according to claim 1 in which said securing means comprises a plate cover having a first raceway defined therein, a cover plate having a second raceway defined therein in complementary registry to said first raceway, bearings disposed in said complementary raceways to provide relative movement between said cover plate and said plate cover, and locking means selectively actuatable to permit and prevent the relative movement between said cover plate and said plate cover.

5. An energy absorbing seat assembly according to claim 4 in which said locking means comprises a spring biased bolt attached to and extending downwardly from said cover plate for selective engagement within a plurality of spaced openings defined in an annular pattern upon said plate cover in register with said bolt.

6. An energy absorbing seat assembly according to claim 4 in which said follower means comprises an arm member pivotally attached to said door and said cover plate and operative to rotate said cover plate in response to movement of said door.

7. An energy absorbing seat assembly according to claim 6 in which said cover plate coacts with the floor board of the vehicle to define a raceway, and bearings are disposed within said raceway to provide rotational movement of said cover plate relative to said floor board.

* * * * *